United States Patent
Kobayashi et al.

(10) Patent No.: US 7,792,657 B2
(45) Date of Patent: Sep. 7, 2010

(54) PRESSURE DISPLAY APPARATUS

(75) Inventors: Toshiaki Kobayashi, Tokyo (JP); Hideki Muramatsu, Tokyo (JP); Hidebumi Seki, Tokyo (JP); Hiroyuki Sakai, Tokyo (JP)

(73) Assignee: Nagano Keiki Co., Ltd., Tokyo (JP)

( * ) Notice: Subject to any disclaimer, the term of this patent is extended or adjusted under 35 U.S.C. 154(b) by 348 days.

(21) Appl. No.: 11/978,651

(22) Filed: Oct. 30, 2007

(65) Prior Publication Data
US 2008/0255793 A1 Oct. 16, 2008

(30) Foreign Application Priority Data
Apr. 16, 2007 (JP) .............................. 2007-106976

(51) Int. Cl.
*G01N 7/00* (2006.01)
*A61B 1/12* (2006.01)
(52) U.S. Cl. ...................... 702/138; 600/159
(58) Field of Classification Search .............. 702/85, 702/98, 138; 73/152.24, 702, 727; 600/159, 600/488, 492, 494; 701/4, 70; 345/82
See application file for complete search history.

(56) References Cited

U.S. PATENT DOCUMENTS
6,328,690 B1 * 12/2001 Takami et al. ............... 600/159

FOREIGN PATENT DOCUMENTS
JP 11-281513 A 10/1999

* cited by examiner

*Primary Examiner*—John H Le
(74) *Attorney, Agent, or Firm*—Birch, Stewart, Kolasch & Birch, LLP

(57) ABSTRACT

A pressure display apparatus that includes a detected signal processor for processing a detected signal Si obtained from a pressure detector for detecting a pressure P, a pressure value display for displaying a detected pressure value Pd at least based on a processed signal Dd obtained from the detected signal processor, and a reference point adjuster for adjusting the display for a given reference pressure value Ps. The reference point adjuster has a reference pressure value setting function to set the reference pressure value Ps for a given magnitude, a deviation value setting capability for obtaining and setting a detected pressure value Pd corresponding to the reference pressure value Ps and the deviation value Ed of the reference pressure value Ps, and a correction capability for correcting at least the detected pressure value Pd regarding the pressure P and displayed on the display based on the deviation Ed.

12 Claims, 7 Drawing Sheets

PRESSURE DISPLAY APPARATUS

BACKGROUND OF THE INVENTION

1. Field of the Invention

The present invention relates to a pressure display apparatus suitable for use with pressure gauges having a reference point adjustment means for adjusting the display on the display for a given reference pressure value.

2. Description of the Related Art

Generally, the digital pressure gauge for gauge pressure measurement eventually fails to read zero upon exposure to the atmosphere (the zero point) because of changes over time in the pressure sensor and its amplifying circuit. This problem is inevitable even in those having a temperature compensation function.

Therefore, such pressure gauges have a zero reset function, in other words a zero adjustment function to read zero on the display under no pressure (upon exposure to the atmosphere). For example, Japanese Patent Publication No. 11 (1999)-281513 discloses a pressure gauge with a zero-fluctuation cut-off function in which a specific range of fluctuation in the pressure is cut off to stabilize the zero point upon exposure to the atmosphere because a differential pressure type digital pressure gauge requiring a high accuracy (0.03% FS) uses a highly sensitive pressure sensor and the pressure value tends to fluctuate due to slight changes in the pressure upon exposure to the atmosphere, which makes pressure zero point adjustment difficult.

However, the prior art pressure gauge (pressure display apparatus) has the following problems.

First, the prior art zero reset function is operated under no pressure (upon exposure to the atmosphere). It is difficult or not easy to expose the pressure gauge to the atmosphere in view of the nature of objects in which the pressure gauge is installed. In such a case, some drawbacks in universality or flexibility are observed; the zero reset function does not substantially work or the zero reset function is operated on limited occasions such as full inspection during which the operation of the detection object is totally stopped.

Second, the pressure gauge usually does not have a complete linearity from zero to the maximum detection pressure. Even if the pressure gauge is zero-adjusted by the zero reset function, it is uncertain that the pressure gauge is correctly adjusted for pressures to be actually detected. The prior art zero reset function is not perfect in view of benefits and convenience in practical use. Some other problems also remain to be solved.

SUMMARY OF THE INVENTION

A purpose of the present invention is to provide a pressure display apparatus having universality and flexibility dramatically improved by allowing the reference point to be adjusted without exposing the pressure gauge to the atmosphere and eliminating the inconvenience that the zero reset function is substantially disabled or subject to limited use.

Another purpose of the present invention is to provide a pressure display apparatus wherein the zero reset function is executed for a reference pressure value of any magnitude so that the adjustment is made for pressures to be actually detected so as to improve benefits and convenience in practical use.

In order to achieve the above purposes, the present invention provides a pressure display apparatus comprising a detected signal processing mean for processing a detected signal obtained from a pressure detection means for detecting a pressure, a pressure value display means for displaying on a display a pressure value (detected pressure value) regarding the pressure at least based on the processed signal obtained from the detected signal processing means, and a reference point adjustment means for adjusting the display on the display for a given reference pressure value, characterized by the fact that the reference point adjusting means has a reference pressure value setting function to set the reference pressure value for a given magnitude, a deviation value setting function to obtain and set the detected pressure value corresponding to the reference pressure value and the deviation value of the reference pressure value, and a correction function to correct at least the detected pressure value regarding the pressure and displayed on the display based on the deviation value.

DETAILED DESCRIPTION OF THE PREFERRED EMBODIMENT

Preferable embodiments of the present invention are described in detail hereafter with reference to the drawings. The attached drawings are intended to facilitate an understanding of the present invention, and not to restrict the invention. Known matters are not explained in detail to prevent the invention from becoming unclear.

The structure of a pressure display apparatus 1 according to this embodiment is described hereafter, with reference to FIGS. 1 to 4.

Figure 2:
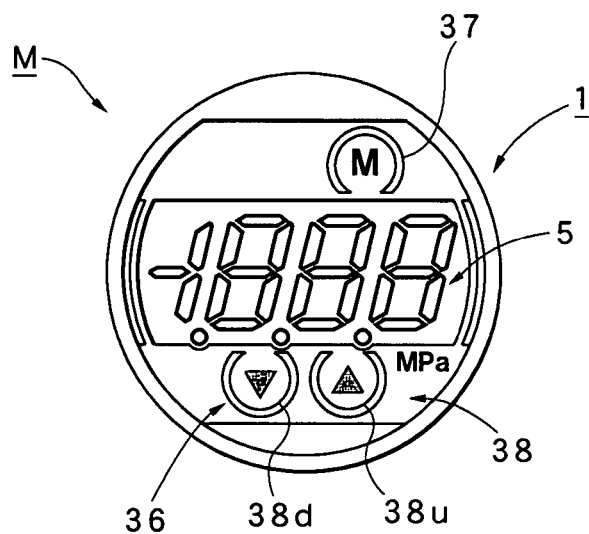
FIG. 2 is a plane view of the exterior of the pressure display apparatus.
Figure 3:
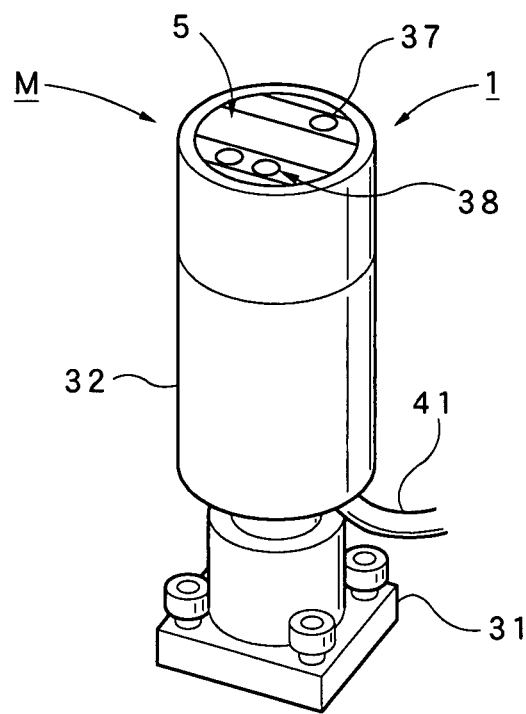
FIG. 3 is a perspective view of the exterior of the pressure display apparatus.

FIGS. 2 and 3 show the exterior of a pressure gauge M in which a pressure display apparatus 1 is installed. The pressure gauge M has a mounting part 31 for mounting to a detection object A shown in FIG. 4, a detection body 32 integrated with the mounting part 31, and a pressure display apparatus 1 attached to the detection body 32.

The detection body 32 has a cylindrical exterior and contains a pressure sensor 13 (FIG. 1) consisting of a strain gauge formed on a metal diaphragm by PCVD process. On the other hand, the pressure display apparatus 1 having a cylindrical exterior is attached to the top surface of the detection body 32. The pressure display apparatus 1 has on the top surface a display 5 consisting of an LED display panel and an operation part 36 as shown in FIG. 2. The display 5 displays 3.5 seven-segment figures. The operation part 36 has a mode key 37 for switching the modes and an up/down key 38 consisting of an up key 38u and a down key 38d. The pressure display apparatus 1 can be rotated about the axis of the detection body 32 to change the orientation (angle) of the display 5.

Figure 4:
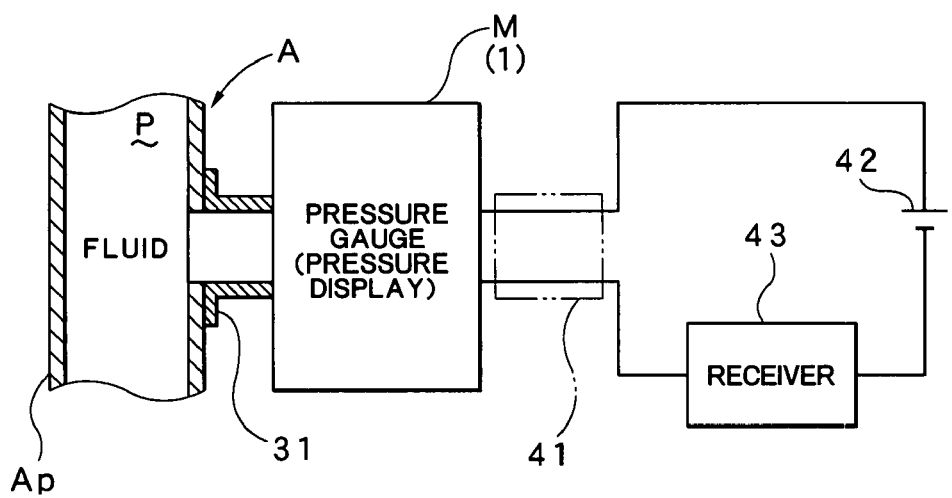
FIG. 4 is an illustration of connection lines showing an application of the pressure display apparatus.

FIG. 4 shows an application of the pressure gauge M. The pressure gauge M is mounted, for example, onto a pipe Ap through which fluid or a detection object A such as gas and oil passes via the mounting part 31. The pressure gauge M is connected to a series circuit of a DC power source (direct current power source) 42 and a receiver 43 in a two-wire transfer system via a connection cable 41.

Figure 1:
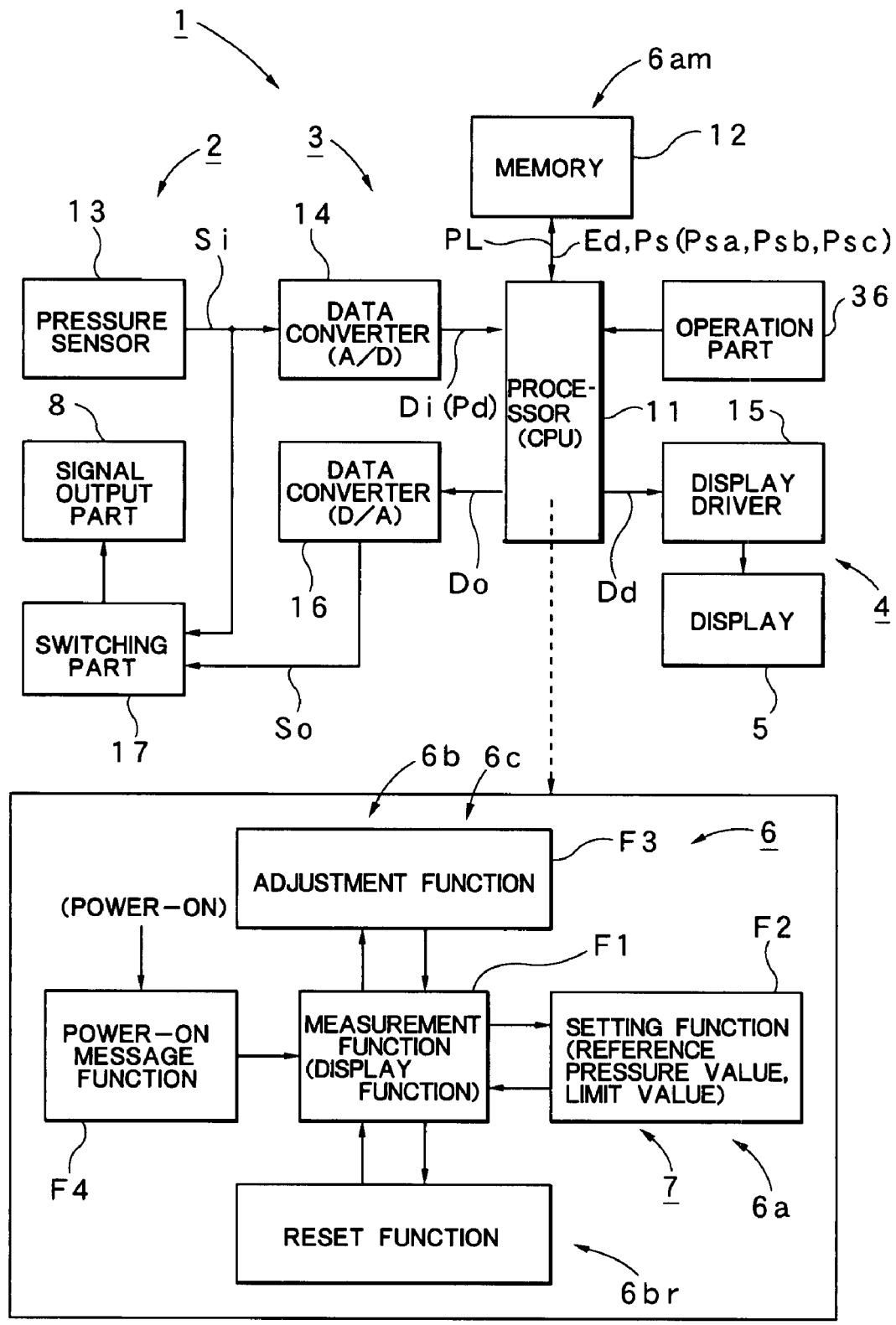
FIG. 1 is a block diagram of the electric system of a pressure display apparatus according to the best embodiment of the present invention.

FIG. 1 is a block diagram of the electric system installed in the pressure gauge M. A processor 11 executing various calculations comprises a microcomputer including a CPU. The processor 11 has a memory 12 connected thereto for storing various data. A pressure sensor 13 detects a pressure (applied pressure) P of the detection object A and outputs a detected signal Si corresponding to the applied pressure P. The pressure sensor 13 constitutes a pressure detection means 2 for detecting the applied pressure P. The detected signal Si is supplied to the processor 11 via an input data converter 14. The input data converter 14 amplifies the detected signal Si, which is an analog signal, to a specific level using an amplifying circuit and converts it to an input signal (digital signal) Di for example at 10 [ms] intervals using an analog-digital (A/D) conversion function. On the other hand, the display 5 is connected to the processor 11 via a display driver 15. The input signal Di is converted to a pressure value (detected pressure value Pd) corresponding to the applied pressure P in the processor 11. Then, a processed signal Dd corresponding to the detected pressure value Pd is supplied to the display driver 15 and the detected pressure value Pd is displayed on the display 5. The operation part 36 including the mode key 37 and up/down key 38 is also connected to the processor 11.

Furthermore, an output data converter 16 is connected to the processor 11. The processor 11 supplies an output signal (digital signal) Do corresponding to the detected pressure value Pd to the output data converter 16 at 10 [ms] intervals. The output data converter 16 converts the output signal Do to an analog output signal So using a digital-analog (D/A) conversion function. The output signal So is a signal regarding the detected pressure value Pd corrected by a correction function 6c described later. The output signal So is supplied to a signal output part 8 via an output switching part 17. The output switching part 17 also receives the detected signal Si from the pressure sensor 13. In this way, the output signal So or the detected signal Si is selectively supplied to the signal output part 8 as the output switching part 17 is switched. These signals are converted to output signals of DC 4 to 20 [mA], DC 1 to 5 [V] in the signal output part 8 and externally output via the above described connection cable 41. The signal output part 8 advantageously allows various signals to be externally output. The output system can be realized by a switching means such as a transistor or relay that is turned on/off by the processor 11 to externally output digital signals using an open collector or contact output.

With the above structure, the input data converter 14 and processor 11 constitute a detected signal processing means 3 for processing the detected signal Si. The processor 11 and display driver 15 constitutes a pressure value display means 4 for displaying on the display 5 the detected pressure value Pd regarding the applied pressure P based on the processed signal Dd obtained from the detected signal processing means 3.

When focusing on the functions, the processor 11 has, as functional blocks extracted in FIG. 1, a measurement function F1 that is the base function to detect and display an applied pressure P, a setting function F2 to set a reference pressure value Ps (Psa . . . ) and a limit value PL described later, an adjustment function F3 to adjust the display on the display for the reference pressure value Ps, a reset function 6br to reset the set deviation value Ed for zero, and a power-on message function F4 to display a power-on massage upon power-on. The processor 11 having the adjustment function F3 and the memory 12 constitute a reference point adjustment means 6 for adjusting the display on the display 5 for the reference pressure value Ps. In this case, the reference point adjustment means 6 has a deviation value setting function 6b to obtain and set the actually detected pressure (detected pressure value Pd) corresponding to the reference pressure value Ps and the deviation value Ed of the reference pressure value Ps and a correction function 6c to correct at least the detected pressure value Pd regarding the applied pressure P and displayed on the display 5 based on the deviation value Ed.

The operation part 36 having the setting function F2 and the processor 11 constitute a reference pressure value setting function 6a to set the reference pressure value Ps for any magnitude. The memory 12 and processor 11 constitutes a reference pressure value storage function 6am to store the set reference pressure value Ps. The reference pressure value Ps is not necessarily stored. However, the reference pressure value storage function 6am can eliminate troublesome input of the reference pressure value in each adjustment operation, realizing a fast and efficient adjustment operation. The reference pressure value storage function 6am also includes a function to store multiple different reference pressure values Psa, Psb, and Psc. Additionally, the processor 11 having the setting function F2 constitutes an error handling means 7 for setting a limit value PL for validating the magnitude of the deviation value Ed and executing an error procedure when the deviation value Ed is not smaller than the limit value PL. In such a case, the error handling means 7 has a correction inhibit function to inhibit a correction function 6c from making a correction and an error display function to indicate an abnormal state. Either one or both of the correction inhibit function and error display function can be provided. Having the above various means and functions, the processor 11 stores processing programs to execute these means and functions.

Specific operations of the above described means and functions provided to the pressure display apparatus 1 according to this embodiment are described hereafter with reference to FIGS. 5 to 8.

Figure 5:
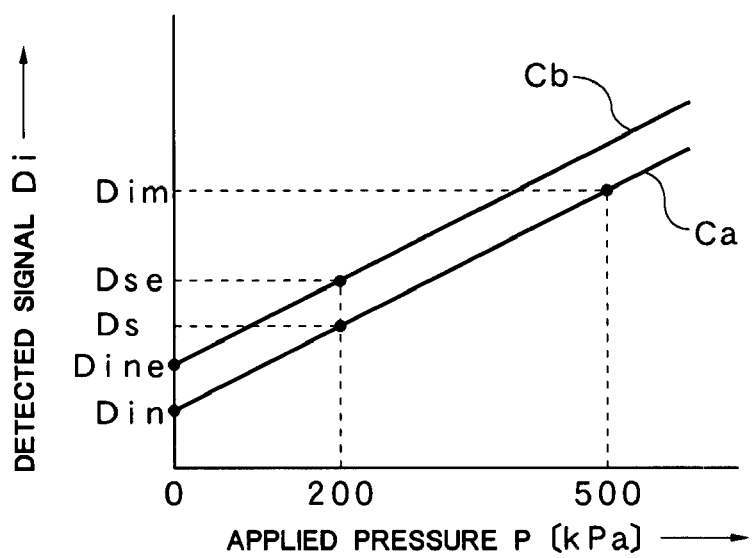
FIG. 5 is a graphical representation showing the characteristics of detected signals in relation to applied pressures in the pressure display apparatus.

First, the factory default initial adjustment is described. FIG. 5 shows the relationship between the pressure (applied pressure) P to the detection object A and the detected signal Di output from the input data converter 14. The measurement range is 0 to 500 [kPa] in this example. The line Ca presents the factory default initial property.

With the detected signal Di being supplied to the processor 11, the instantaneous applied pressure P to the pressure sensor 13 is obtained by the following equation:

$$P=(Pm-Pn)\times\{(Di-Din)/(Dim-Din)\}+Pn \quad (11)$$

in which Pn (minimum) and Pm (maximum) are applied pressures corresponding to the zero point and span point of the pressure sensor 13, respectively; and Din and Dim are detected signals corresponding to the applied pressure Pn and Pm, respectively. When the measurement range is 0 to 500 [kPa], Pn is 0 [kPa] and Pm is 500 [kPa]. In the factory default initial adjustment, Din and Dim corresponding to applied pressures of 0 [kPa] and 500 [kPa], respectively, are stored in the memory 12 as initial values together with Pn and Pm.

The equation (11) is always satisfied unless the output properties of the pressure sensor 13 are subject to changes. In practice, Din corresponding to the zero point becomes Dine over time as shown by the property Cb in FIG. 5. Therefore, when the applied pressure P is calculated by the equation (11), an error of Dine−Din occurs. In the pressure display apparatus 1 according to this embodiment, this error is the deviation value Ed. Then, the following equation in which the deviation value Ed is incorporated is used to calculate an accurate applied pressure P.

$$P=(Pm-Pn)\times\{(Di-Din-Ed)/(Dim-Din)\}+Pn \qquad (12)$$

In this case, upon exposure to the atmosphere or when the applied pressure P is zero [kPa], Ed can immediately be calculated by Dine−Din (Dine=Din) because Din is known. However, the output value Dx of the pressure sensor 13 corresponding to the applied pressure P in the initial adjustment have to be obtained in advance for adjustment with any applied pressure P. The output value Dx can be calculated by the following equation using the reference pressure value Ps.

$$Dx=(Dim-Din)\times\{(Ps-Pn)/(Pm-Pn)\}+Din \qquad (13)$$

On the other hand, the deviation value Ed is obtained by the following equation for adjustment (correction).

$$Ed=Di-Dx \qquad (14)$$

Assuming that the reference pressure value Ps is 200 [kPa], the output value Dx is Ds, and Ds becomes Dse over time, the deviation value Ed is:

$$Ed=Dse-Ds \qquad (15)$$

Ed is used to calculate the applied pressure P by the equation (12).

On the other hand, the output signal Do corresponding to the obtained applied pressure P (detected pressure value Pd) is supplied to the data converter 16. The output signal Do is calculated by the following equation:

$$Do=(Dom-Don)\times\{(P-Pn)/(Pm-Pn)\}+Don \qquad (16)$$

in which Don and Dom are output signals corresponding to the zero point and span point of the applied pressure P, respectively.

Therefore, the output signal Do is adjusted in complying with the adjustment of the reference pressure value Ps. Don and Dom are stored in the memory 12 as initial values in the same manner as Din and Dim described above.

Figure 6:
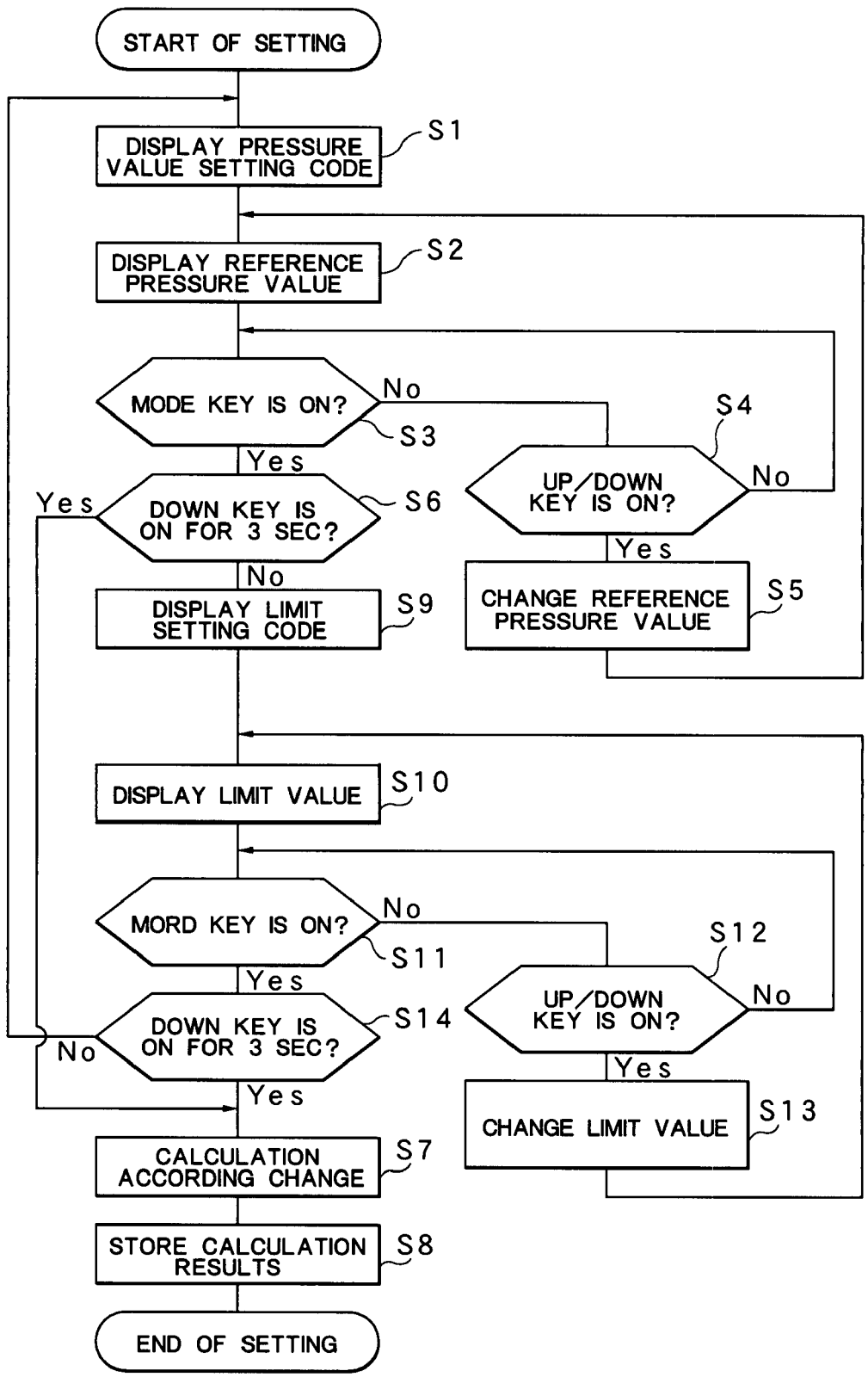
FIG. 6 is a flowchart of the setting mode procedure of the pressure display apparatus.
Figure 7:
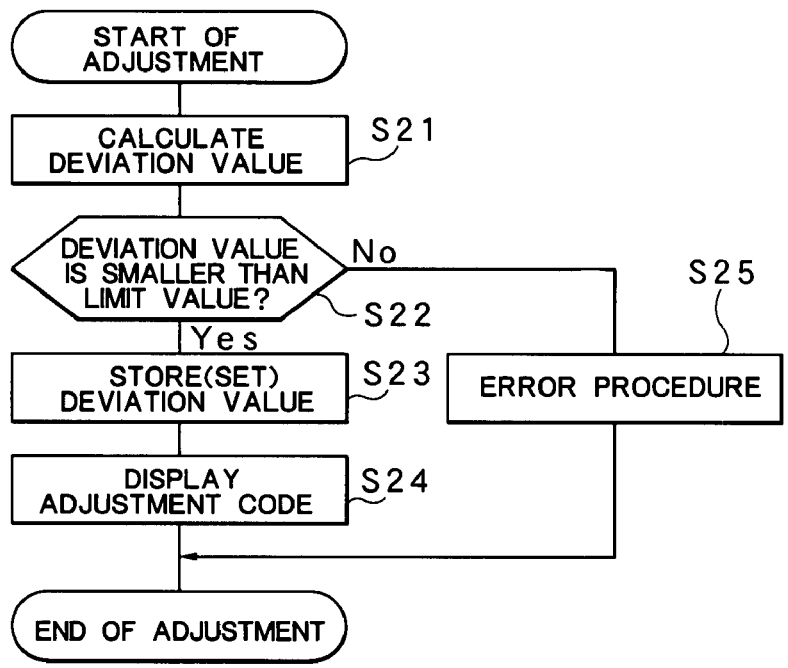
FIG. 7 is a flowchart of the adjustment mode procedure of the pressure display apparatus.
Figure 8:
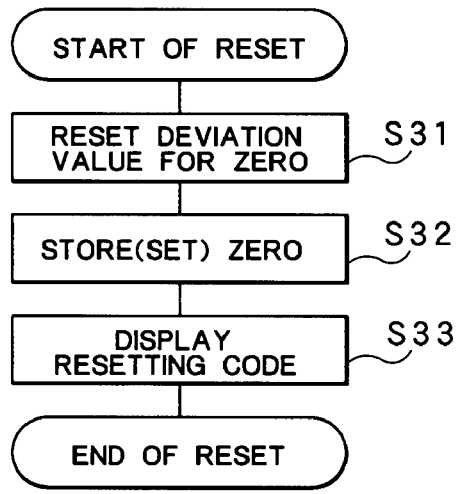
FIG. 8 is a flowchart of the reset mode procedure of the pressure display apparatus.

Specific operations (procedures) of the pressure display apparatus 1 according to this embodiment are described hereafter with reference to the flowcharts in FIGS. 6 to 8.

Upon power-on, the power-on message function F4 displays a power-on message. More specifically, the entire display 5 is turned on for two seconds. Then, the measurement function F1 (measurement mode) is executed. While the entire display 5 is turned on for two seconds, set data necessary for the pressure calculation such as the initialized Pn, Pm, Din, Dim, Don, Dom, reference pressure value Ps, and limit value PL are read from the memory 12.

First, the setting function 2 (setting mode) is described with reference to the flowchart shown in FIG. 6. During the execution of the measurement mode, the mode key 37 is pressed for three seconds to shift to the setting mode. During the shift to the setting mode, the reference pressure value setting code "oFF" is turned on for one second (Step S1). Following this, the reference pressure value Ps is displayed (Step S2). The initialized or factory default reference pressure value Ps (default) is zero [kPa]. Therefore, "zero" is displayed when the reference pressure value Ps has not been set. For setting a new reference pressure value Ps, the up ky 38u or down key 38d is operated here to set any new reference pressure value Ps (Steps S3, S4, and S5). For example, when the standard value of the fluid pressure (applied pressure P) in the pipe Ap described above is specified for 200 [kPa], the reference pressure value Ps is set for 200 [kPa]. In such a case, the up key 38u is operated to display "200."

After a targeted reference pressure value Ps is displayed, the mode key 37 is pressed and the down key 38d is also pressed for three seconds to shift to the measurement mode. During this shift, a new output value Dx is calculated by the equation (13) and the output value Dx is rewritten (Steps S3, S6, S7, and S8).

If the mode key 37 is pressed and the down key 38d is not pressed in Step S3, the limit setting code "oFL" is turned on for one second (Step S9), following which the limit value PL is displayed (Step S10). The limit value PL is used to evaluate the magnitude of the deviation value Ed. If the deviation value Ed is not smaller than the limit value PL during the adjustment (correction), the error handling means 7 executes the error procedure. The initialized or factory default limit value PL (default) is 5.0 [% FS] of the measuring range span. When the measuring range is 0 to 500 [kPa], the limit value PL is 25 [kPa]. When the limit value PL has not been set, the display 5 displays "5.0." For setting a new limit value PL, the up key 38u or down key 38d is operated here to set any new limit value PL (Steps S11, S12, and S13).

After a targeted limited value PL is displayed, the mode key 37 is pressed and the down key 38d is also pressed for three seconds to shift to the measurement mode. During this shift, the new reference pressure value Ps is used to calculate a new output value Dx by the equation (13) and the new limit value PL is used to calculate the count value DL of a detected signal Di based on the span of the corresponding detected signal Di by the following equation (Steps S11, S14, and S7):

$$DL=(Dim-Din)\times PL/100 \qquad (17)$$

The new output value Dx and count value DL are rewritten together with the new reference pressure value Ps and limit value PL (Step S8). Then, the setting function F2 (setting mode) completes.

The adjustment function F3 (adjustment mode) is described hereafter with reference to the flowchart shown in FIG. 7. During the execution of the measurement mode, the mode key 37 and up key 38u are simultaneously pressed for one second to shift to the adjustment mode. During the shift to the adjustment mode, the deviation value Ed is immediately calculated by the equation (14) (Step S21). The obtained deviation value Ed (absolute value) is compared with the limit value PL. When the deviation value Ed is smaller than the limit value PL, the calculated deviation value Ed is stored in the memory 12 for rewrite (Steps S22 and S23). Then, the adjustment code "Adj" is turned on for one second (Step S24), which is followed by the automatic shift to the measurement mode. Detected pressure values Pd are corrected according to the equation (12) from then on. In the embodiment, the measuring range is 0 to 500 [kPa] and the reference pressure value Ps is 200 [kPa]; therefore, the display 5 displays "200" after shifted to the measurement mode. The magnitude of the output signal So from the output data converter 16 is corrected in a similar manner to the detected pressure value Pd displayed.

On the other hand, when the obtained deviation value Ed (absolute value) is compared with the set limit value PL and the deviation value Ed is not smaller than the limit value PL in Step S22, the error handling means 7 executes the error procedure (Step S25), making it easily understood that the deviation value Ed is not smaller than the limit value PL for some reasons and that quick action can be taken to handle the situation. The error handling means 7 may have a function to inhibit the correction function 6c from making any correction. In this way, the correction limit is set, eliminating an inconvenient increase in the error after correction. The deviation value Ed before the update is used in subsequent procedures. Another function of the error handling means 7 is an error display function to indicate the abnormal state, in which case an error message "E-0" is displayed. The deviation value Ed can be classified by magnitude so as to display a message "E-3," "E-1," or "E-2" for a large, small, or intermediate deviation value Ed where necessary, making known the degree of deviation. The error display function allows the user to know that something abnormal has occurred through the pressure display apparatus 1. For example, the user can find a failure of the detection object A or the pressure gauge M (pressure display apparatus 1), leading to improved functionality.

The reset function 6br (reset mode) is described hereafter with reference to the flowchart shown in FIG. 8. During the execution of the measurement mode, the mode key 37 and up key 38u are simultaneously pressed for 6 seconds to shift to the reset mode. During the shift to the reset mode, the set deviation value Ed is immediately reset for zero (Step S31) and zero is stored in the memory 12 (Step S32). Meanwhile, the reset code "rES" is turned on for 1 second (Step S33), which is followed by the automatic shift to the measurement mode. Therefore, the procedures are executed using the deviation value Ed of zero from then on. The reset function 6br advantageously serves to easily restore the initial state where necessary.

Figure 9:
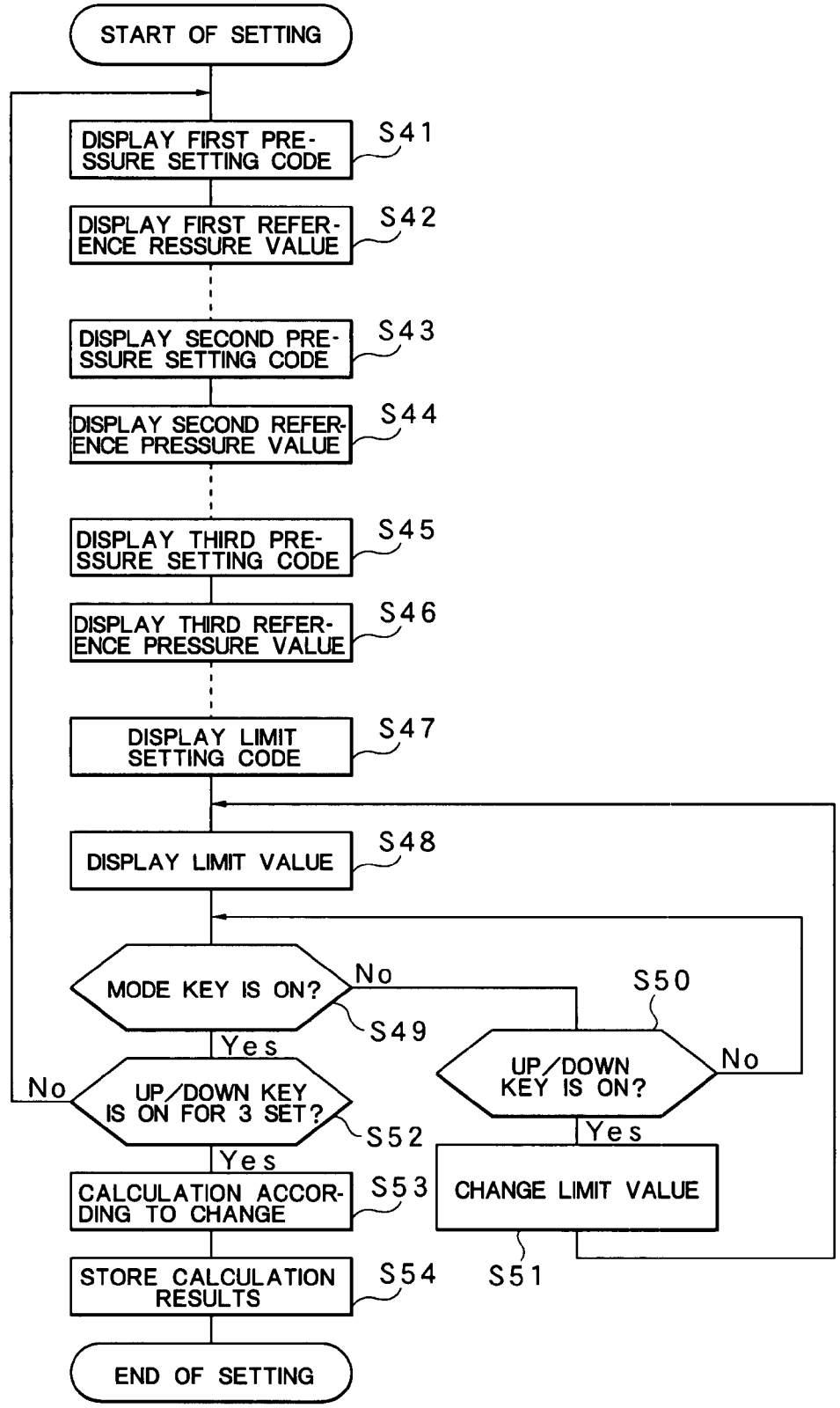
FIG. 9 is a flowchart of the setting mode procedure of the pressure display apparatus for setting multiple reference pressure values.

In the above described setting mode and adjustment mode, a single reference pressure value Ps and a single limit value PL are used. However, multiple different reference pressure values Psa, Psb, and Psc (and limit values PL . . . ) can be set (stored). A case in which three reference pressure values Psa, Psb, and Psc are set is described hereafter with reference to the flowchart shown in FIG. 9.

During execution of the measurement mode, the mode key 37 is pressed for three seconds to shift to the setting mode. During the shift to the setting mode, the first pressure setting code "oF1" is turned on for one second (Step S41), following which, the first reference pressure value Psa is displayed (Step S42). Then, the same procedures as Steps S3 to S5 shown in FIG. 6 are repeated. In other words, the up key 38u or down key 38d is operated to set any first reference pressure value Psa. After the first reference pressure value Psa is set, the mode key 37 is pressed to turn on the second pressure setting code "oF2" for one second (Step S43). Following this, the second reference pressure value Psb is displayed (Step S44). Then, the same procedures as Steps S3 to S5 shown in FIG. 6 are repeated. In other words, the up key 38u or down key 38d is operated to set any second reference pressure value Psb. After the second reference pressure value Psb is set, the mode key 37 is pressed to turn on the third pressure setting code "oF3" for one second (Step S45). Following this, the third reference pressure value Psc is displayed (Step S46). Then, the same procedures as Steps S3 to S5 shown in FIG. 6 are repeated. In other words, the up key 38u or down key 38d is operated to set any third reference pressure value Psc. After the third reference pressure value Psc is set, the mode key 37 is pressed to turn on the limit setting code "oFL" for one second (Step S47). Following this, the limit value PL is displayed (Step S48). The up key 38u or down key 38d is operated here to set any new limit value PL (Step S49, S50, and S51). Multiple different limit values PL . . . can also be set in a similar manner to the first to third reference pressure values Psa to Psc.

After a targeted limit value PL is displayed, the mode key 37 is pressed and the down key 38d is also pressed for three seconds to shift to the measurement mode. During this shift, the input first, second, and third reference pressure values Psa, Psb, and Psc are used in calculation by the equation (13) to obtain new output values Dxa, Dxb, and Dxc. The new limit value PL is used to calculate the count value DL of a detected signal Di based on the span of the corresponding detected signal Di by the equation (17) (Steps S49, S52, and S53). The new output values Dxa . . . and count value DL are stored for rewrite together with the new reference pressure values Psa . . . and limit value PL (Step S54), completing the setting mode for multiple reference pressure values Psa . . . . With multiple reference pressure values Psa . . . being set, for example, different reference pressure values Ps can be stored for the nighttime and for the daytime when the pressure has to be changed between them, which is significantly convenient in various applications.

Figure 10:
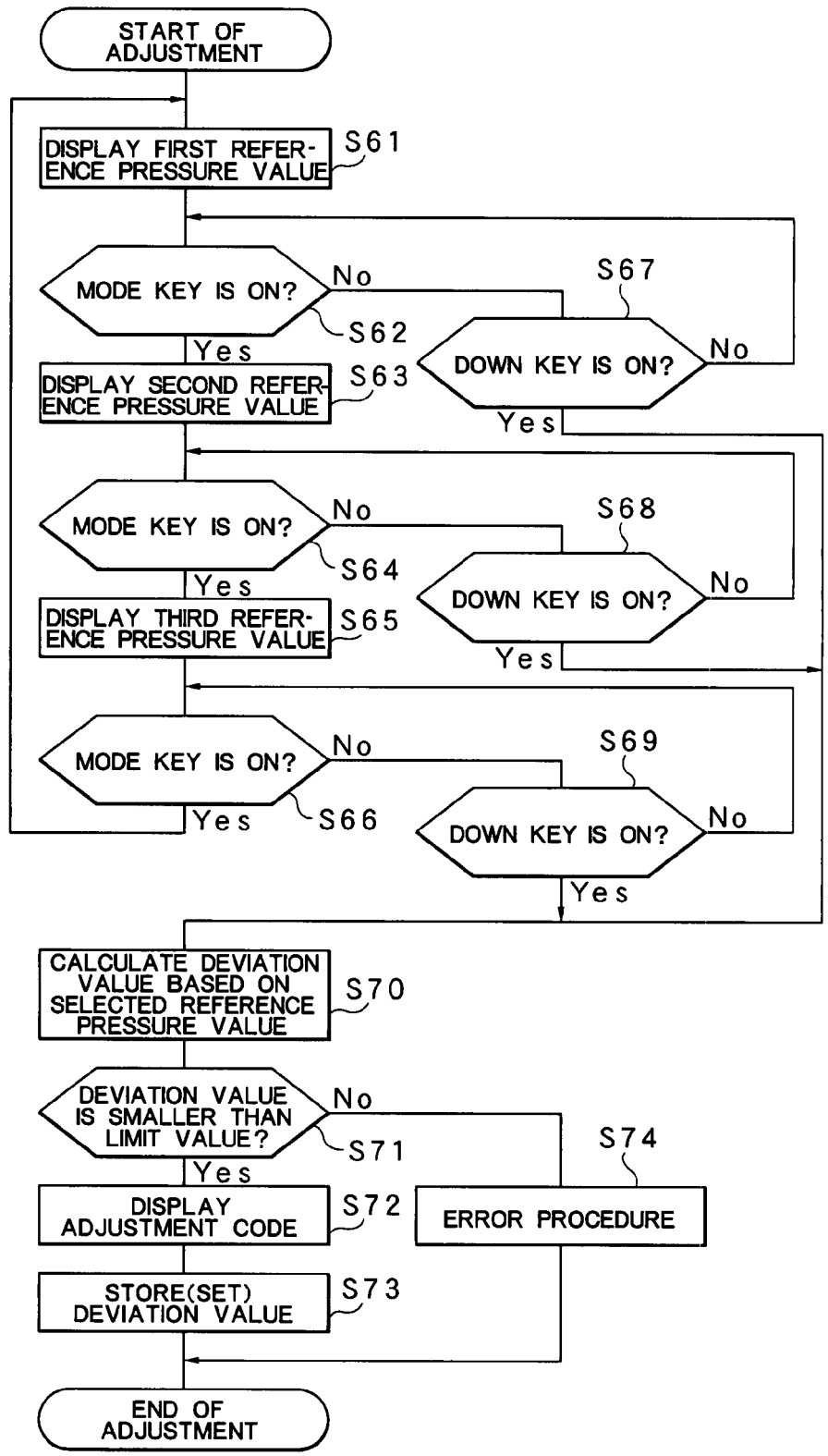
FIG. 10 is a flowchart of the adjustment mode procedure of the pressure display apparatus for using multiple set reference pressure values.

The adjustment mode in the case that multiple different reference pressure values Psa, Psb, and Psc are set (stored) is described hereafter with reference to the flowchart shown in FIG. 10.

During the execution of the measurement mode, the mode key 37 and up key 38u are simultaneously pressed for one second to shift to the adjustment mode. In this case, no immediate adjustment (correction) is made. First, the set first reference pressure value Psa is displayed (Step S61). Each time the mode key 37 is pressed, the second reference pressure value Psb and the third reference pressure value Psc are displayed in sequence (Steps S62 to S66). If the down key 38d is pressed while one of the reference pressure values Psa . . . is displayed, that reference pressure value, for example the second reference pressure value Psb, is selected (Steps S67 to S69). Following this, the deviation value Ed is calculated by the equation (14) based on the selected second reference pressure value Psb (Step S70). The obtained second deviation value Ed (absolute value) is compared with the set limit value PL. When the deviation value Ed is smaller than the limit value PL, the calculated deviation value Ed is stored in the memory 12 for rewrite; otherwise, the same procedures as Steps S22 to S25 shown in FIG. 7 are repeated.

In the pressure display apparatus 1 according to this embodiment, a reference pressure value Ps of any magnitude is selected, an actually detected pressure value Pd corresponding to the reference pressure value Ps and the deviation value Ed from the reference pressure value Ps are obtained, and at least the pressure value Pd displayed on the display 5 is corrected using the deviation value Ed; therefore, there is no need of the pressure gauge being exposed to the atmosphere for adjustment. This eliminates the inconvenience that the zero reset function is substantially disabled or subject to limited use, dramatically improving universality and flexibility. The zero set function can be executed based on a reference pressure value Ps of any magnitude, which allows for adjustment around an actual detection range of pressures. For example, when multiple pressure gauges are provided to a single detection object at different positions, the pressure gauges can be adjusted for consistent display, improving benefits and convenience in practical use.

The best embodiment is described above. The present invention is not restricted to this embodiment. Any modifications in detailed structure, shape, material, quantity, and numerical value can be made without departing from the scope of the present invention and so can any additions or omissions where necessary. For example, the pressure display apparatus 1 is used for a pressure gauge M. The pressure gauge M is not necessarily the described one. The pressure display apparatus 1 is similarly applicable to any types of pressure gauges and displays other than pressure such as various physical quantities and information.

The invention claimed is:

1. A pressure display apparatus, comprising:
    a detected signal processor configured to process a detected signal obtained from a pressure detection means for detecting a pressure;
    a pressure value display device configured to display on a display a pressure value (detected pressure value) regarding said pressure at least based on the processed signal obtained from said detected signal processor; and
    a reference point adjustment device configured to adjust the display for a given reference pressure value,
    wherein said reference point adjustment device is configured to set the reference pressure value for a given magnitude, to obtain and set a detected pressure value corresponding to said reference pressure value and set a deviation value of the reference pressure value, and to correct at least the detected pressure value based on said deviation value, and
    wherein the reference point adjustment device is configured to reset the set deviation value for zero.

2. The pressure display apparatus according to claim 1, reference point adjustment device is configured to store a set reference pressure value.

3. The pressure display apparatus according to claim 2, reference point adjustment device is configured to store multiple different reference pressure values.

4. The pressure display apparatus according to claim 1 further comprising:
    a signal output device configured to output signals regarding the pressure value adjusted by said reference point adjustment device.

5. The pressure display apparatus according to claim 4, wherein the signal output device is configured to output digital signals in accordance with a switch being turned on/off.

6. The pressure display apparatus according to claim 1 further comprising;
    a signal output device configured to output detected signals obtained from said pressure detector.

7. The pressure display apparatus according to claim 6, wherein said signal output device is configured to send digital signals in accordance with a switch being turned on/off.

8. The pressure display apparatus according to claim 1, further comprising:
    a pressure gauge.

9. A pressure display apparatus, comprising:
    a detected signal processor configured to process a detected signal obtained from a pressure detection means for detecting a pressure;
    a pressure value display device configured to display on a display a pressure value (detected pressure value) regarding said pressure at least based on the processed signal obtained from said detected signal processor;
    a reference point adjustment device configured to adjust the display for a given reference pressure value, wherein said reference point adjustment device is configured to set the reference pressure value for a given magnitude, to obtain and set a detected pressure value corresponding to said reference pressure value and set a deviation value of the reference pressure value, and to correct at least the detected pressure value based on said deviation value; and
    an error handling device configured to set a limit value for evaluating a magnitude of said deviation value and execute an error procedure when said deviation value is not smaller than the limit value.

10. The pressure display apparatus according to claim 9, wherein the error handling device is configured to inhibit said correction function from making any correction.

11. The pressure display apparatus according to claim 9, wherein the error handling device is configured to indicate a predetermined abnormal situation.

12. A pressure display apparatus, comprising:
    a detected signal processor configured to process a detected signal obtained from a pressure detection means for detecting a pressure;
    a pressure value display device configured to display on a display a pressure value (detected pressure value) regarding said pressure at least based on the processed signal obtained from said detected signal processor;
    a reference point adjustment device configured to adjust the display for a given reference pressure value, wherein said reference point adjustment device is configured to set the reference pressure value for a given magnitude, to obtain and set a detected pressure value corresponding to said reference pressure value and set a deviation value of the reference pressure value, and to correct at least the detected pressure value based on said deviation value; and
    a pressure gauge connected to a series circuit of a direct current power source and a receiver in a two-line transfer system via a connection cable.

\* \* \* \* \*